United States Patent [19]

Tsukamura et al.

[11] Patent Number: 4,660,189
[45] Date of Patent: Apr. 21, 1987

[54] OPTICAL DISK PLAYER HAVING REDUCED LASER OUTPUT DURING TRACK CHANGES

[75] Inventors: Yoshihiro Tsukamura; Toshiro Morimoto; Matayasu Kubo; Masataka Mukai, all of Kanagawa, Japan

[73] Assignee: Sony Corporation, Tokyo, Japan

[21] Appl. No.: 714,870

[22] Filed: Mar. 22, 1985

[30] Foreign Application Priority Data

Mar. 24, 1984 [JP] Japan ................................. 59-56877
Feb. 22, 1985 [JP] Japan ................................. 60-24368

[51] Int. Cl.⁴ ......................... G11B 27/36; G11B 7/00
[52] U.S. Cl. ......................................... 369/32; 369/33; 369/54; 369/58; 369/116; 250/205
[58] Field of Search ..................... 369/32, 33, 54, 58, 369/100, 106, 111, 116, 41, 50; 250/204, 205; 358/342, 907

[56] References Cited

U.S. PATENT DOCUMENTS

| | | | |
|---|---|---|---|
| 4,157,568 | 6/1979 | Ohki et al. ..................... | 369/116 X |
| 4,283,785 | 8/1981 | Miyauchi et al. ................ | 369/116 |
| 4,328,506 | 5/1982 | Yoshida et al. ................. | 369/116 X |
| 4,380,015 | 4/1983 | Ito et al. ........................ | 369/106 X |
| 4,417,179 | 11/1983 | Fujimura et al. ............... | 250/205 X |
| 4,419,750 | 12/1983 | Howe ............................. | 369/116 X |
| 4,426,693 | 1/1984 | Satoh et al. .................... | 369/116 X |
| 4,507,767 | 3/1985 | Takasugi ......................... | 369/116 X |
| 4,509,156 | 4/1985 | Ohara et al. .................... | 369/116 X |
| 4,516,235 | 5/1985 | Tarzaiski ........................ | 369/116 |
| 4,549,190 | 10/1985 | Ohara ............................. | 369/106 X |

Primary Examiner—Raymond F. Cardillo
Assistant Examiner—Wayne R. Young
Attorney, Agent, or Firm—Lewis H. Eslinger; Alvin Sinderbrand

[57] ABSTRACT

This invention relates to an optical disk recording and reproducing apparatus for recording a predetermined signal on and/or reproducing the same from a writable disk which is rotated at a constant linear velocity by using a laser from a laser source. In this case, upon reproducing the above-described signal, if a signal recorded on the inner periphery of the disk is accessed, during the period from this addressing up to the time when the linear velocity at the inner periphery of the disk becomes constant, on the basis of a spindle lock signal, the beam power of the laser from the laser source and irradiating the disk is decreased to thereby prevent useless data from being rewritten on the disk.

3 Claims, 14 Drawing Figures

FIG. 2
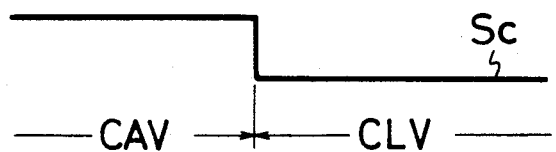
— CAV — | — CLV —
FIG. 3A
(Reference Signal REF·FG)
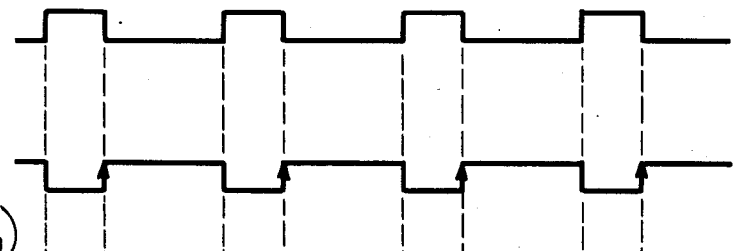
FIG. 3B
(Phase-inverted Signal $\overline{REF \cdot FG}$ of Reference Signal)
FIG. 3C
(Spindle Rotation Signal FG)
FIG. 3D
(Phase Comparing Output $P_D$)
FIG. 3E
(Spindle Lock Signal $S_L$)
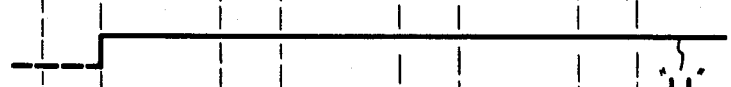
"H"
FIG. 3F
(Spindle Rotation Signal FG)
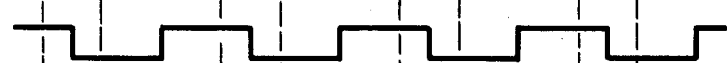
FIG. 3G
(Phase Comparing Output $P_D$)
FIG. 3H
(Spindle Lock Signal $S_L$)
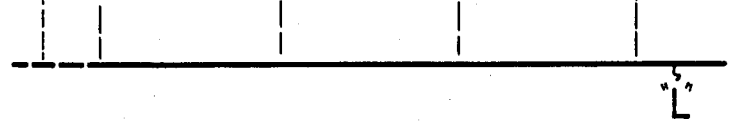
"L"

FIG. 4A
(Spindle Lock Signal $S_L$)
FIG. 4B
(Linear Velocity)
FIG. 4C
(Laser Power)
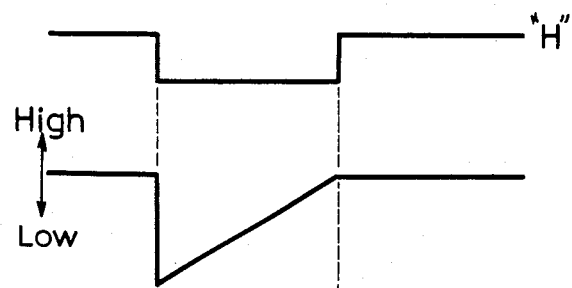
FIG. 5
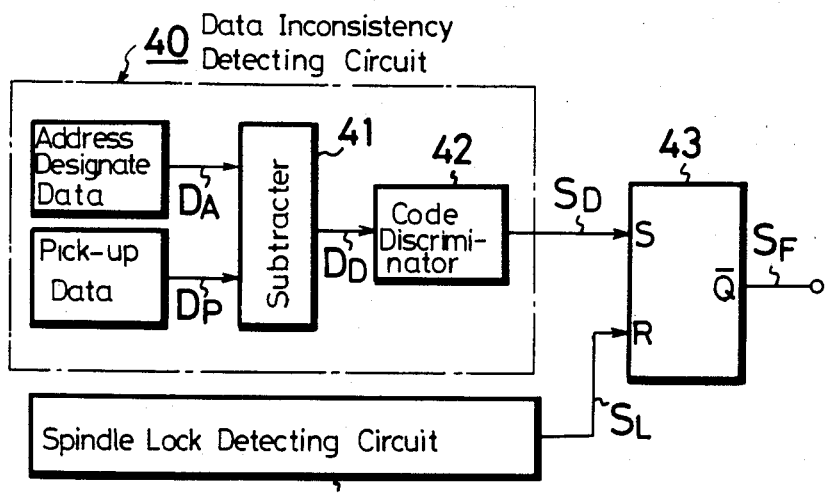

OPTICAL DISK PLAYER HAVING REDUCED LASER OUTPUT DURING TRACK CHANGES

BACKGROUND OF THE INVENTION

1. Field of the Invention

This invention relates generally to optical disk reproducing apparatus and, in particular, is directed to an optical disk player using a rewritable disk.

2. Description of the Prior Art

In an optical disk recording and reproducing apparatus of a so-called DRAW system using a writable disk, when a laser light amount per unit area irradiated on the disk exceeds a predetermined value, the writing (or recording) of data is carried out on the disk.

As the disk drive system for recording and/or reproducing data, there are known a CAV (constant angular velocity) drive system in which recording and/or reproducing data on and/or from a disk is carried out under the condition that the revolution number of the disk is kept constant and a CLV (constant linear velocity) drive system in which recording and/or reproducing data on and/or from a disk is carried out under the condition that the linear velocity of the disk is kept constant.

By the way, in the optical disc player of such DRAW system, upon reproducing data, a laser power must be controlled so as not to exceed a light amount by which data can be written on the disk. For example, in an example of the optical disk player of DRAW system capable of employing both the CAV and CLV drive systems to drive a disk with a diameter of 20 cm, in the CAV drive mode, the revolution number of the disk is constant as 900 revolutions/minute (r.p.m.), while in the CLV drive mode, in order that the linear velocity is made constant, the disk is rotated at 900 r.p.m. at its inner periphery and as an optical pick up device or head is moved toward the outer periphery of the disk, the revolution number of the disk is lowered and the disk is rotated at 525 r.p.m. in its outer periphery.

As described above, when the optical disk player is driven in the CAV drive mode, since the revolution number of the disk is constant, the linear velocity is different between the inner periphery and the outer periphery of the disk, or the linear velocity is slow as about 5.2 m/sec at the inner periphery of the disk and becomes higher as the outer periphery of the disk is approached and is about 8.7 m/sec at the outer periphery. Accordingly, in order that the laser power upon writing is made the constant laser power per unit time, the laser power upon writing is controlled such that the laser power becomes about 14 mW at the inner periphery of the disk, while it is increased gradually as the outer periphery of the disk is approached and it becomes about 17 mW at the outer periphery of the disk. Thus, the writing is carried out always at optimum power.

Upon reading (or reproducing), since the reading of the disk is always carried out by a laser power at which value no writing is performed on the disk at its inner periphery where the linear velocity is slow, there is no fear that the rewriting on the disk will be carried out even at the outer periphery of the disk where the linear velocity is high. In this example, when the linear velocity at the inner periphery of the disk is about 5.2 m/sec the laser power upon reading is selected to be about 1.3 mW.

On the other hand, when the optical disk player is driven in the CLV drive mode, since the linear velocity is fixed to be about 5.2 m/sec, upon writing, the laser power is about 14 mW, while upon reading, in order to remove a fear of the rewriting and to improve an S/N (signal-to-noise) ratio, a laser power is desired to be as large as possible and in this example, fixed to be about 1.3 mW.

However, upon reproducing in the CLV drive mode, when the track to be reproduced is changed, if the optical head is jumped from, for example, the outer peripheral track to the inner peripheral track, the optical head can be moved instantly but it takes several seconds to change the revolution number of the disk to the normal revolution number due to the moment of inertia of the disk and so on. As a result, in the reading mode of the inner peripheral track, the revolution number, the linear velocity and the laser power must respectively be 900 r.p.m., 5.2 m/sec and 1.3 mW but will initially be about 525 r.p.m., about 3.0 m/sec and 1.3 mW, respectively, because the disc revolutions cannot change instantaneously. Thus, there will occur such a fear that the laser beam amount will exceed the light amount capable of the writing and hence a useless data will be rewritten into the disk.

To solve this problem, it may be considered to inhibit the emission of the laser beam until the revolution number of the innermost periphery of the disk is locked to a predetermined revolution number. In this case, however, the appointed address of the innermost periphery of the disk can not be accessed and the just tracking state can not be established. As a result, it is necessary to always excite the laser.

OBJECTS AND SUMMARY OF THE INVENTION

It is an object of this invention to provide an optical disk player employing a constant linear velocity drive mode, which can prevent useless data from being rewritten into a disk.

It is a further object of this invention to provide a novel optical disk player using a rewritable optical disk.

According to one aspect of this invention, there is provided an optical information reproducing apparatus for reproducing an information recorded on a disk recording medium by the irradiation of a laser beam comprising:

(a) an optical pick up device having a laser beam source for emitting a laser beam to read said information recorded on said disk recording medium;

(b) motor control means for controlling a motor to rotate said disk recording medium such that a linear velocity of a track on said disk recording medium reproduced by said optical pick up device becomes a predetermined value;

(c) detecting means for detecting that when said optical pick up device performs a track change, a linear velocity of a changed track is not arrived up to said predetermined value; and (d) laser output control meeans for controlling the laser beam from said laser beam source to be a low level on the basis of an output from said detecting means during a period until said linear velocity of said track on said disk recording medium reaches to said predetermined value, wherein when said optical pick up device carries out a track change, said laser beam from said laser beam source is controlled to be a low level until said linear velocity of said changed track on said disk recording medium reaches to said predetermined value by said motor control means to thereby prevent data from being written into said changed track.

These and other objects, features and advantages of the optical information reproducing apparatus of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 2 is a waveform diagram showing an example of a mode select pulse used in this invention;

FIGS. 3A to 3H and FIGS. 4A to 4C are respectively waveform diagrams useful for explaining the operation of the optical disk player shown in FIG. 1; and FIG. 5 is a block diagram showing an example of control signal forming means useful for explaining this invention.

DESCRIPTION OF THE PREFERRED EMBODIMENT

Figure 1:
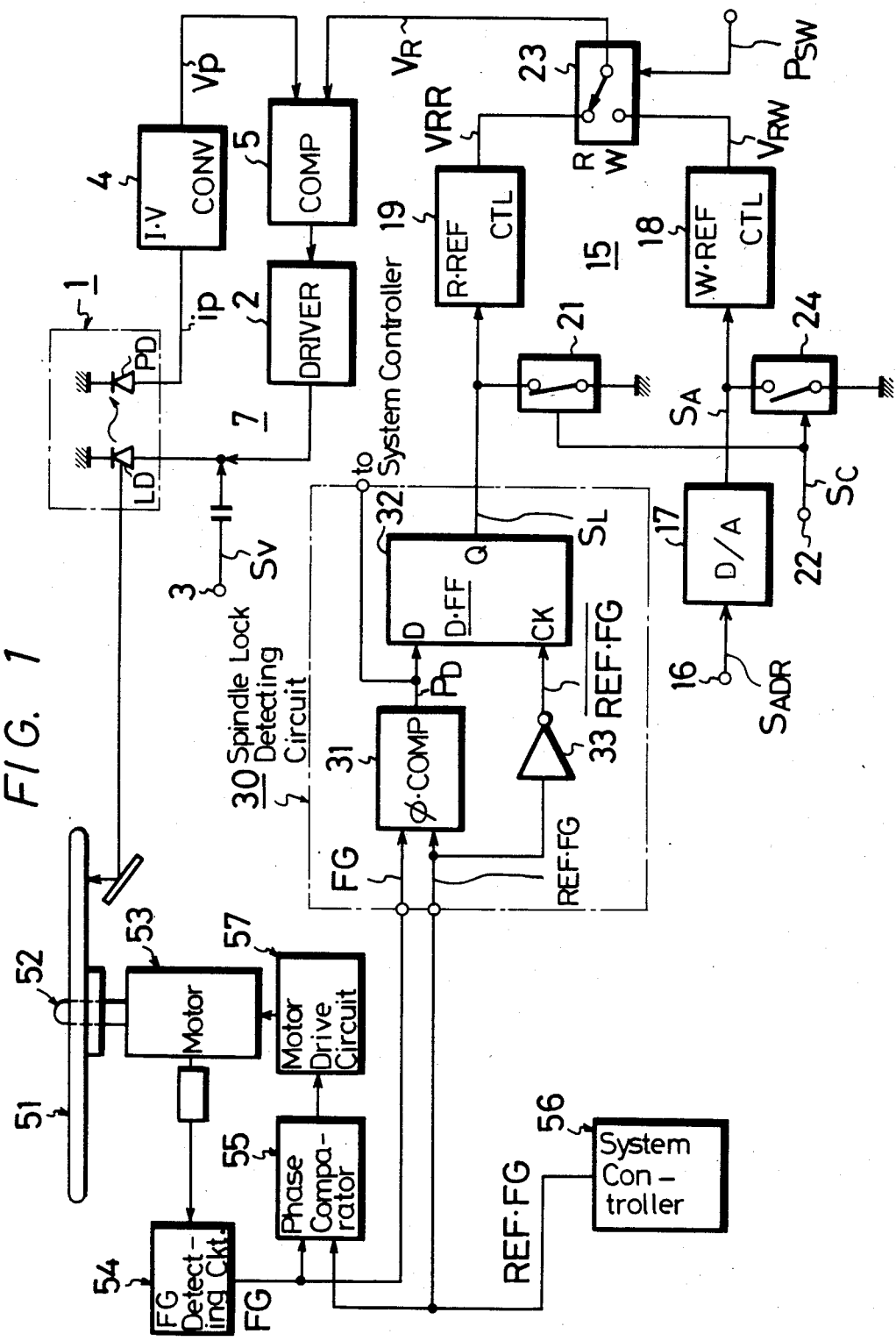
FIG. 1 is a systematic block diagram showing a main part of an embodiment of the optical disk player according to this invention.

Now, an embodiment of the optical disk player according to this invention will be described in detail with reference to FIG. 1 and the following figures. FIG. 1 is a block diagram showing a main part of an embodiment of the optical disk player according to this invention.

In FIG. 1, reference numeral 51 designates an optical disk and this optical disk 51 is rotated by a motor 53 through a spindle 52. The rotation speed of the motor 53 is detected by an FG detecting circuit 54 as a signal FG and this signal FG is supplied to a phase comparator 55 as one input thereof. Reference numeral 56 designates a system controller and this system controller 56 supplies a signal REF·FG to the phase comparator 55 as the other input thereof so that in the CAV drive mode, the revolution number of the disk becomes constant, while in the CLV drive mode, the linear velocity becomes constant in each track on the optical disk 51. Then, on the basis of the error signal from the phase comparator 55, the motor 53 is controlled by a motor drive circuit 57 such that the signal FG follows the signal REF·FG.

In FIG. 1, reference numeral 1 designates a laser section which comprises a semiconductor laser diode LD and a light emission diode, for example, a PIN diode PD for monitoring whether this laser diode LD is operated normally or not. The laser diode LD is excited by the output from a driver 2. Upon writing data, a digital signal $S_V$ such as an audio signal, a video signal and the like is applied to a terminal 3 and the output from the driver 2 is modulated by this digital signal $S_V$.

A current ip flowing through the PIN diode PD is corresponding to the light beam amount of the laser diode LD and this current ip is supplied to and converted to a voltage Vp by a current-to-voltage converter 4. This voltage Vp is supplied to a voltage comparator 5 in which it is compared with a reference voltage $V_R$ which will be described later. Then, by the compared output from the voltage comparator 5, the driver 2 is controlled so that the driver output thereof necessary for writing and reproducing the data becomes a predetermined level. Accordingly, since the excitation power to the laser diode LD is automatically controlled by a closed loop 7, this closed loop 7 is operated as an APC (automatic power control) loop.

The reference voltage $V_R$ supplied to the APC loop 7 is set as different values between the recording mode and the reproducing mode. Reference numeral 15 generally designates a circuit for setting the reference voltage $V_R$. In this case, in the CAV drive mode in which the data is written and/or reproduced under the condition that the revolution number of the disk is made constant, a data write address data $S_{ADR}$ supplied to a terminal 16 is supplied to and converted to an analog signal $S_A$ by a D/A (digital-to-analog) converter 17 and this analog signal $S_A$ is supplied to a reference voltage control circuit 18 as its control voltage so that a value of a write reference voltage $V_{RW}$ therefrom is controlled.

In other words, in the CAV drive mode, the write reference voltage $V_{RW}$ is gradually decreased from the outer periphery of the disk to its inner periphery so that the laser power becomes smaller as the inner periphery of the disk is approached.

When data is reproduced, a reproducing reference voltage $V_{RR}$ derived from a data reproducing reference voltage control circuit 19 is controlled to become a constant value. To this end, at the input stage of the reference voltage control circuit 19, there is provided a first switching circuit 21 and this first switching circuit 21 is controlled by a mode selecting pulse $S_C$ (see FIG. 2 and this pulse $S_C$ is formed by the system controller 56) which is supplied to a terminal 22 such that in the CAV drive mode the first switching circuit 21 is turned on. Accordingly, the reference voltage $V_{RR}$ used to set the laser power at a value (for example, 1.3 mW) suitable for the playback is supplied to the voltage comparator 5. Reference numeral 23 designates a change-over switch which relates to the write and/or reproducing mode and this change-over switch 23 is changed in position by the write and read pulses $P_{SW}$ derived from the system controller 56.

On the other hand, in the CLV drive mode, since the linear velocity is constant, in writing the data, the write reference voltage $V_{RW}$ is controlled to become a constant value in order to afford the constant laser power. To this end, the write reference voltage control circuit 18 is provided at its input stage with a second switching circuit 24 and this second switching circuit 24 is controlled by the mode select pulse $S_C$ such that in the CLV drive mode, it is turned on. Thus, regardless of the value of the analog signal from the D/A converter 17, the write reference voltage $V_{RW}$ is held at a constant value.

Upon reproducing the data, in order to inhibit the useless data from being written in the disk, the laser power is controlled on the basis of a spindle lock signal $S_L$.

This will be described more fully. In FIG. 1, reference numeral 30 generally designates a disk drive spindle lock detecting circuit and this detecting circuit 30 includes a phase comparator 31. To the phase comparator 31 are supplied the reference signal REF·FG (FIG. 3A) with a reference frequency produced from the system controller 56 and the spindle rotation signal FG (FIG. 3C) detected from the frequency generator 54 which is provided in association with the spindle 52, respectively.

In the phase comparator 31, a phase difference between the rising edges of the signals REF·FG and FG is compared with each other and the phase compared output $P_D$ (FIG. 3D) therefrom is supplied to the system controller 56 and a D terminal of a D-type flip-flop circuit 32. On the other hand, the reference signal REF·FG is inverted in phase by an inverter 33 and a phase-inverted reference signal $\overline{\text{REF·FG}}$ (FIG. 3B) is supplied to the D-type flip-flop circuit 32 as a clock CK thereof.

When the rotation frequency of the spindle 52 is identical with the reference rotation frequency supplied from the system controller 56 and the linear velocity is constant, since the level of the compared output $P_D$ which is latched in the flip-flop circuit 32 by the clock CK is always "H" (high level), the flip-flop circuit 32 produces the spindle lock signal $S_L$ as shown in FIG. 3E.

On the other hand, upon accessing the address, since the frequency of the spindle rotation signal FG does not become coincident with the frequency of the reference signal REF·FG (see FIGS. 3A and 3F), at this time, the duty ratio of the phase-compared output $P_D$ is varied (FIG. 3G) so that as shown in FIG. 3H, the flip-flop circuit 32 produces the spindle lock signal $S_L$ of "L" (low level). Consequently, the relation between the linear velocity of the disk and the spindle lock signal $S_L$ becomes as shown in FIG. 4.

The spindle lock signal $S_L$ is supplied to the control circuit 19 for the reproducing reference voltage $V_{RR}$, whereby during the period in which the spindle lock signal $S_L$ is at "L", the reproducing reference voltage $V_{RR}$ is lowered in level.

For example, when the laser power in writing the data is 14 mW (average value), as shown in FIG. 4C, the reproducing reference voltage $V_{RR}$ is controlled such that when the data in the track of the outermost periphery is reproduced, the laser power becomes about 1.3 mW. As a result, when the data in the track of the innermost periphery of the disk is addressed, the reproducing reference voltage $V_{RR}$ is controlled such that the laser power becomes lower, for example, about 1.0 mW.

When the linear velocity in the innermost periphery of the disk becomes a predetermined value, the laser power is returned to the original power (about 1.3 mW). Thus, during the period in which the sled carrying the optical head is moved from the outermost periphery of the disk to its innermost periphery and the linear velocity of the innermost periphery becomes the predetermined value, the laser power is controlled to become about 1.0 mW so that even when the disk 51 is rotated at low speed, there is no fear that the laser light amount per unit time will exceed the light amount enough for writing.

The first and second switching circuits 21 and 24 are changed over in ganged relation with each other by the mode select pulse $S_C$.

According to this circuit arrangement, even when the sled is moved from the innermost periphery of the disk to its outermost periphery, the locked state of the spindle 52 is released so that the laser power is lowered similarly as above. In such accessing of the address, even if the laser power is not lowered, an unintentional accident such as the rewriting of data and the like will not occur inadvertently. The reason is that since the linear velocity is higher in the outer periphery of the disk, even if the laser power in reproducing the data is not lowered or is kept as it is, there is no fear that the laser light amount per unit time will exceed the light amount enough for the writing.

However, even though the laser power is lowered upon accessing the data on the outermost periphery of the disk, the data accessing, the tracking servo and the like will not be troubled thereby. Therefore, in this invention, when the sled is moved from the innermost periphery of the disk to its outermost periphery, the laser power is controlled in intensity.

The reason for this is that a laser power control system can be simplified in construction.

By the way, if the laser power is controlled only when the sled is moved from the outermost periphery of the disk to the innermost periphery thereof, a control signal (signal corresponding to the spindle lock signal $S_L$) to be supplied to the control circuit 19 must be produced by the circuit arranged as shown in FIG. 5.

In FIG. 5, reference numeral 40 generally designates a data inconsistency detecting circuit, in which upon accessing the address, an address designate data (for example, 16-bit data) $D_A$ supplied from the system controller 56 and an address data (similar 16-bit data) $D_P$ picked up by the optical head upon accessing the address are supplied to a digital subtracter 41. The more significant or upper 10 bit data of, for example, these data $D_A$ and $D_P$ are used to execute the subtraction ($D_A - D_P$) and the subtracted output $D_D$ is supplied to a code discriminator 42 which then forms an identifying signal $S_D$ which becomes "L" when the outer periphery is accessed, while it becomes "H" when the inner periphery is accessed.

If a flip-flop circuit 43 is set by this identifying signal $S_D$ and reset by the spindle lock signal $S_L$, the flip-flop circuit 43 produces at its inverting terminal $\overline{Q}$ a control signal $S_F$ which becomes "L" only when the inner periphery is accessed.

Accordingly, if this control signal $S_F$ is used to vary the reproducing reference voltage $V_{RR}$ in the control circuit 19, only when the address is accessed from the outermost periphery of the disk to its innermost periphery, the laser power is decreased, so that the above-described object can be achieved.

However, as will be clear from FIG. 5, in order to achieve this object, in addition to the spindle lock detecting circuit 30, the data inconsistency detecting circuit 40 and the flip-flop circuit 43 are required, which makes the circuit arrangement complicated.

In the above description, the control operation of such a case is explained in which while the data written in the outermost periphery of the disk is being reproduced, the address of its inner periphery is accessed. This case is such an example where the difference of the revolution number of the disk between the inner periphery and the outer periphery thereof is very large (three times in the above-described example). However, for the case where the difference of the revolution number is not so large as above, for example, about twice, the afore-said control operation can be employed similarly.

As described above, according to this invention, upon data reproducing, when the data recorded in the inner periphery of the disk is accessed, during the period from the address being accessed to the linear velocity in the inner periphery of the disk becoming constant, the beam light amount irradiated on the disk from the diode LD is decreased on the basis of the spindle lock signal S. As a result, it can be avoided that until the linear velocity in the inner periphery of the disk becomes constant, the beam light amount exceeds the beam light amount large enough for writing the data.

As set forth above, according to this invention, it is possible to provide the optical disk player of simple construction which can remove the defects inherent in the prior art optical disk reproducing apparatus using the rewritable disk.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. An optical information reproducing apparatus for reproducing information recorded on a disk recording medium by the irradiation of a laser beam comprising:
   (a) an optical pick up device having a laser beam source for emitting a laser beam to read said information recorded on said disk recording medium;
   (b) motor control means for controlling a motor to rotate said disk recording medium such that a linear velocity of a track on said disk recording medium reproduced by said optical pick up device becomes a predetermined value;
   (c) detecting means for detecting that when said optical pick up device performs a track change, a linear velocity of a changed track is not arrived up to said predetermined value; and
   (d) laser output control means for controlling the laser beam from said laser beam source to be a low level on the basis of an output from said detecting means during a period until said linear velocity of said track on said disk recording medium reaches to said predetermined value, wherein when said optical pick up device carries out a track change, said laser beam from said laser beam source is controlled to be a low level until said linear velocity of said changed track on said disk recording medium reaches to said predetermined value by said motor control means to thereby prevent data from being written into said changed track.

2. An optical information reproducing apparatus as claimed in claim 1, in which said motor control means includes motor signal generating means for generating a motor signal indicative of a rotation state of said motor, reference signal generating means for generating a reference signal indicative of a desired rotation state of said motor in order that said disk recording medium is rotated at a predetermined linear velocity, and motor drive means for driving said motor such that said motor signal follows said reference signal so as to decrease a difference between both of said motor signal and reference signal to zero.

3. An optical information reproducing apparatus as claimed in claim 2, in which said detecting means includes phase comparing means supplied at one input terminal thereof with said motor signal and at the other input terminal thereof with said reference signal and for producing an error signal, and rotation state detecting means supplied with said error signal and for detecting that said motor is not in said desired rotation state.

* * * * *